(12) United States Patent
Arinaga et al.

(10) Patent No.: US 8,796,872 B2
(45) Date of Patent: Aug. 5, 2014

(54) WIND TURBINE GENERATOR

(75) Inventors: Shinji Arinaga, Nagasaki (JP); Tsuyoshi Wakasa, Nagasaki (JP); Takatoshi Matsushita, Nagasaki (JP); Masaaki Shibata, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 101 days.

(21) Appl. No.: 13/058,694

(22) PCT Filed: Feb. 20, 2009

(86) PCT No.: PCT/JP2009/053014
§ 371 (c)(1),
(2), (4) Date: Apr. 20, 2011

(87) PCT Pub. No.: WO2010/095240
PCT Pub. Date: Aug. 26, 2010

(65) Prior Publication Data
US 2011/0193345 A1    Aug. 11, 2011

(51) Int. Cl.
*H02P 9/00*    (2006.01)
(52) U.S. Cl.
USPC ............................................................ 290/44
(58) Field of Classification Search
CPC ....................................................... H02P 9/00
USPC ............................................................ 290/44
See application file for complete search history.

(56) References Cited

U.S. PATENT DOCUMENTS

| | | | |
|---|---|---|---|
| 3,751,678 A * | 8/1973 | Kawasaki et al. | 361/5 |
| 4,256,972 A * | 3/1981 | Wyatt et al. | 307/68 |
| 5,095,221 A * | 3/1992 | Tyler | 290/40 C |
| 6,921,985 B2 | 7/2005 | Janssen et al. | |
| 7,355,296 B2 * | 4/2008 | Ichinose et al. | 290/44 |

(Continued)

FOREIGN PATENT DOCUMENTS

| | | |
|---|---|---|
| CN | 101034855 A | 9/2007 |
| JP | 52-066910 A | 6/1977 |

(Continued)

OTHER PUBLICATIONS

Sisa, Erich M.; "Power Outages and Power Dip Ride-Through"; Siemens- Motors & Relcon Drives Division , Member IEEE; pp. 37-43.

(Continued)

*Primary Examiner* — Joseph Waks
(74) *Attorney, Agent, or Firm* — Westerman, Hattori, Daniels & Adrian, LLP

(57) ABSTRACT

An object is to provide a wind turbine generator that is capable of continuously operating an auxiliary unit even when a grid fault occurs. Provided is a wind turbine generator including an auxiliary-unit breaker provided in a power line that connects an auxiliary unit to a power grid, wherein the auxiliary-unit breaker has a current-resisting capacity within a range that tolerates a current that flows in a low-voltage event and does not exceed a tolerable current of a motor provided in the auxiliary unit.

5 Claims, 7 Drawing Sheets

(56) References Cited

U.S. PATENT DOCUMENTS

| | | | |
|---|---|---|---|
| 7,423,412 B2* | 9/2008 | Weng et al. | 322/20 |
| 7,447,568 B2* | 11/2008 | Christensen et al. | 700/298 |
| 7,622,815 B2* | 11/2009 | Rivas et al. | 290/44 |
| 8,222,758 B2* | 7/2012 | Arinaga et al. | 290/44 |
| 2007/0216164 A1* | 9/2007 | Rivas et al. | 290/44 |
| 2007/0273336 A1* | 11/2007 | Davis | 322/22 |
| 2008/0143182 A1* | 6/2008 | Raju | 307/26 |
| 2008/0157529 A1 | 7/2008 | Rivas et al. | |
| 2008/0304188 A1* | 12/2008 | Ichinose et al. | 361/20 |
| 2011/0018270 A1* | 1/2011 | Corcelles Pereira et al. | 290/44 |
| 2011/0140430 A1* | 6/2011 | Ritter et al. | 290/44 |

FOREIGN PATENT DOCUMENTS

| | | |
|---|---|---|
| JP | 9-28032 A | 1/1997 |
| JP | 2002-044859 A | 2/2002 |
| JP | 2008-278725 A | 11/2008 |
| WO | WO 2009078075 A1 * | 6/2009 |

OTHER PUBLICATIONS

Akhmatov, Vladislav; "Variable-speed Wind Turbines with Doubly-fed Induction Generators Part II: Power System Stability"; Wind Engineering, vol. 26, No. 3, 2002, pp. 171-188.

Internation Search Report of PCT/JP2009/053014, date of mailing May 19, 2009.

Japanese Decision to Patent a Grant dated Apr. 23, 2013, issued in corresponding Japanese Patent Application No. 2011-500411, w/ partial English translation.

Korean Notice of Allowance dated Dec. 20, 2012, issued in corresponding Korean Patent Application No. 10-2011-7003619, w/ English translation.

Chinese Office Action dated Jan. 28, 2013, issued in corresponding Chinese Patent Application No. 200980132814.8, w/ English translation.

Decision to Grant a Patent dated Apr. 10, 2014, issued in Chinese Patent Application No. 200980132814.8, (2 pagse), with partial translation.

* cited by examiner

WIND TURBINE GENERATOR

TECHNICAL FIELD

The present invention relates to a wind turbine generator.

BACKGROUND ART

When a fault occurs in power grids in which wind turbines are interconnected, the grid voltage momentarily drops. In this case, at the power grid side, the grid in which the fault has occurred is disconnected and only the unaffected grids are reactivated. This takes about 3 seconds at most.

When the grid voltage drops, the following events occur in wind turbines.

1) Because generator output momentarily drops, this causes overspeed.
2) A large transient current flows in a generator.
3) A large transient current flows also in electric motors of auxiliary units.

In order to safely operate wind turbines to cope with these events, for example, techniques disclosed in Non Patent Citations 1 and 2 have been proposed.

For example, in order to suppress the occurrence of overspeed, Non Patent Citation 1 discloses the use of blade pitch control (line 6 of page 180 and line 14 of page 181 in Non Patent Citation 1).

In addition, in order to avoid possible damage to a converter that controls the rotor current by making a large transient current flow in a rotor coil of a generator, Non Patent Citation 1 discloses a technique in which the converter is temporarily stopped. More specifically, in the disclosed technique, the converter is switched off when a current of a predetermined value or greater flows in the generator rotor coil. Non Patent Citation 1 discloses a technique in which, when the above-described events occur, the rotor coil is short circuited to cause the same operation as a normal induction generator, thereby causing converter control capacity to be lost.

Furthermore, at the time of a voltage drop, the disclosure of Non Patent Citation 2 provides a supply of power to a drive circuit, etc. from an uninterruptible power supply (UPS: Uninterruptible Power Supply).

Non Patent Citation 1: Vladislav Akhmatov, "Variable-speed Wind Turbines with Doubly-fed Induction Generators Part II: Power grid Stability", Wind Engineering Vol. 26, No. 3, 2002, pp. 171-188.

Non Patent Citation 2: Eric M. Sisa, "Power Outages And Power Dip Ride-Through", IEEE Annual Texile, Fiber and Film Industry Conference, 1995, pp. 37-43.

DISCLOSURE OF INVENTION

However, the above-described Non Patent Citations 1 and 2 do not describe specific methods of responding to a drop in the grid voltage. In addition, handling of auxiliary units is also not considered.

An object of the present invention is to provide a wind turbine generator that is capable of continuously operating auxiliary units even when a grid fault occurs.

The present invention is a wind turbine generator including a generator, a main breaker provided in a power line that connects the generator to a power grid, and an auxiliary-unit breaker provided in a power line that connects an auxiliary unit to the power grid, wherein the auxiliary-unit breaker has a current-resisting capacity within a range that tolerates a current that flows in a low-voltage event and that does not exceed a tolerable current of a motor provided in the auxiliary unit, and the main breaker has a current-resisting capacity that is superior to the current-resisting capacity of the auxiliary-unit breaker and that is within a range that does not exceed a tolerable current of the generator.

According to the present invention, the auxiliary-unit breaker has a current-resisting capacity that makes it possible to endure the occurrence of an overcurrent caused by voltage drops due to low-voltage events and, in addition, the main breaker has superior current-resisting capacity than the auxiliary-unit breaker. Therefore, even if a low-voltage event occurs, it is possible to continuously maintain the connection between the power grid and the auxiliary-unit breaker, as well as the connection between the power grid and the generator, without causing disconnection in either breaker. Accordingly, even when a low-voltage event occurs, it is possible to maintain the operation of the auxiliary unit.

That the current-resisting capacity of the main breaker is superior to the current-resisting capacity of the auxiliary-unit breaker means, for example, that the tolerable current level of the main breaker is set higher than the tolerable current level of the auxiliary-unit breaker.

The above-described wind turbine generator may include a plurality of blades and a blade control unit that controls pitch angles of the plurality of blades, wherein the blade control unit performs control of the pitch angles of the blades during a period in which drive power that enables its operation thereof is being supplied.

With this configuration, because the blade control unit performs control of pitch angles of the blades so long as the blade control unit is supplied with drive power that enables its operation the pitch angles of the blades are continuously controlled according the same control logic, regardless of whether a low-voltage event has occurred or not. This eliminates the need to switch the control specifics between when a low-voltage event has occurred and when a low-voltage event has not occurred, thereby making it possible to simplify the control.

The above-described wind turbine generator may a converter that converts output of the generator rotor from three-phase AC power to DC power, an inverter that converts DC power output from the converter to three-phase AC power, and a control unit that controls the converter and the inverter, wherein the control unit monitors a rotor current of the generator or the DC voltage converted by the converter and, when the rotor current or the DC voltage exceeds a current threshold or a voltage threshold set in advance, stops the operation of the converter and the inverter.

In this way, with regard to the converter and the inverter, stopping their operation is determined in accordance with the state of the rotor current of the generator or the DC voltage converted by the converter, regardless of the states of the auxiliary units or the power grid. This control is typical control that has conventionally been performed. Therefore, the need to add a new function or to set a new judgment standard for the low-voltage events is eliminated, and normal control can be employed without modification.

The present invention affords an advantage in that an auxiliary unit can be continuously operated even when a grid fault occurs.

EXPLANATION OF REFERENCE

Figure 1:
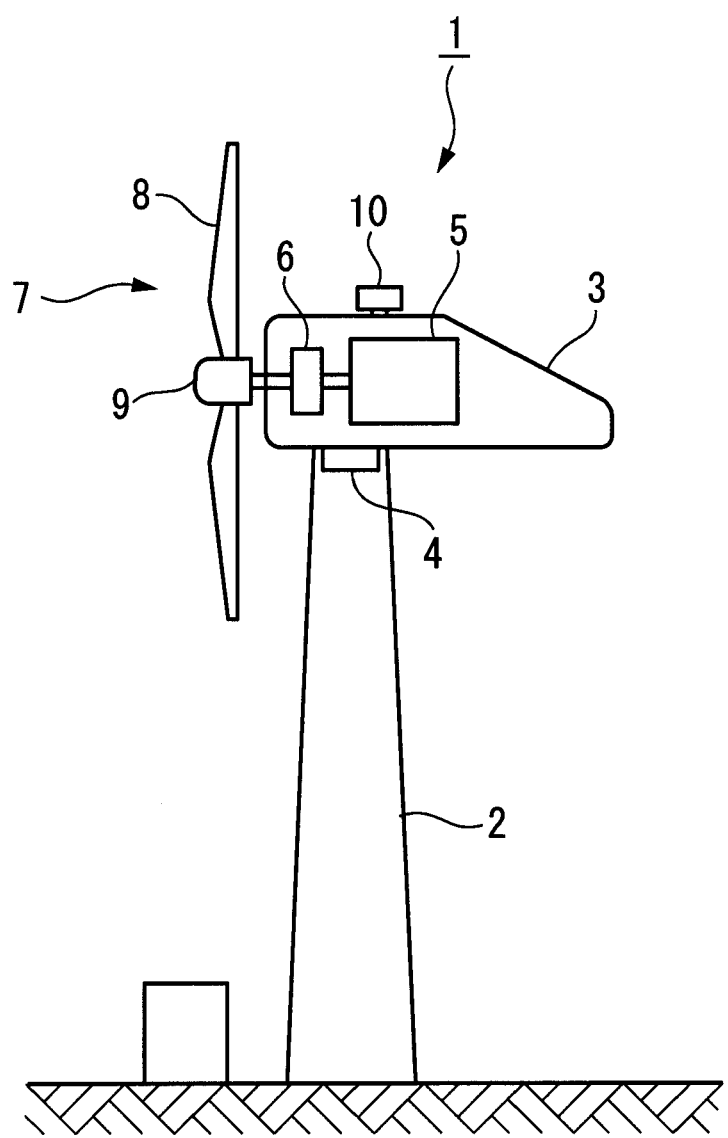
FIG. 1 is a block diagram showing the overall configuration of a wind turbine generator according to an embodiment of the present invention.

1: wind turbine generator
5: generator
13: power grid
14: active rectifier
15: DC bus
16: inverter
17: AC-DC-AC converter
19: main control unit
21: converter drive control unit
22: blade control unit
24: transformer
25: auxiliary unit
27: crowbar circuit
30: main breaker
40: auxiliary-unit breaker

BEST MODE FOR CARRYING OUT THE INVENTION

An embodiment of a wind turbine generator according to the present invention will be described below with reference to the drawings.

FIG. 1 is a block diagram showing the overall configuration of a wind turbine generator according to this embodiment. As shown in FIG. 1, a wind turbine generator 1 includes a tower 2 and a nacelle 3 provided at the top end of the tower 2. The nacelle 3 can be turned in the yaw direction and is oriented in a desired direction using a nacelle turning mechanism 4. A generator 5 and a gear 6 are installed in the nacelle 3. A rotor of the generator 5 is connected to a turbine rotor 7 via the gear 6.

The turbine rotor 7 is provided with blades 8 and a hub 9 that supports the blades 8. The blades 8 are provided so that pitch angles thereof can be varied. The hub 9 accommodates a hydraulic cylinder that drives the blades 8 and a servo valve that supplies hydraulic pressure to the hydraulic cylinder. The hydraulic pressure supplied to the hydraulic cylinder is controlled by the degree of opening of the servo valve, and thereby, the blades 8 are controlled at desired pitch angles.

The nacelle 3 further includes an anemometer/anemoscope 10. The anemometer/anemoscope 10 measures wind speed and wind direction. The nacelle 3 is turned in response to the wind speed and wind direction measured by the anemometer/anemoscope 10.

Figure 2:
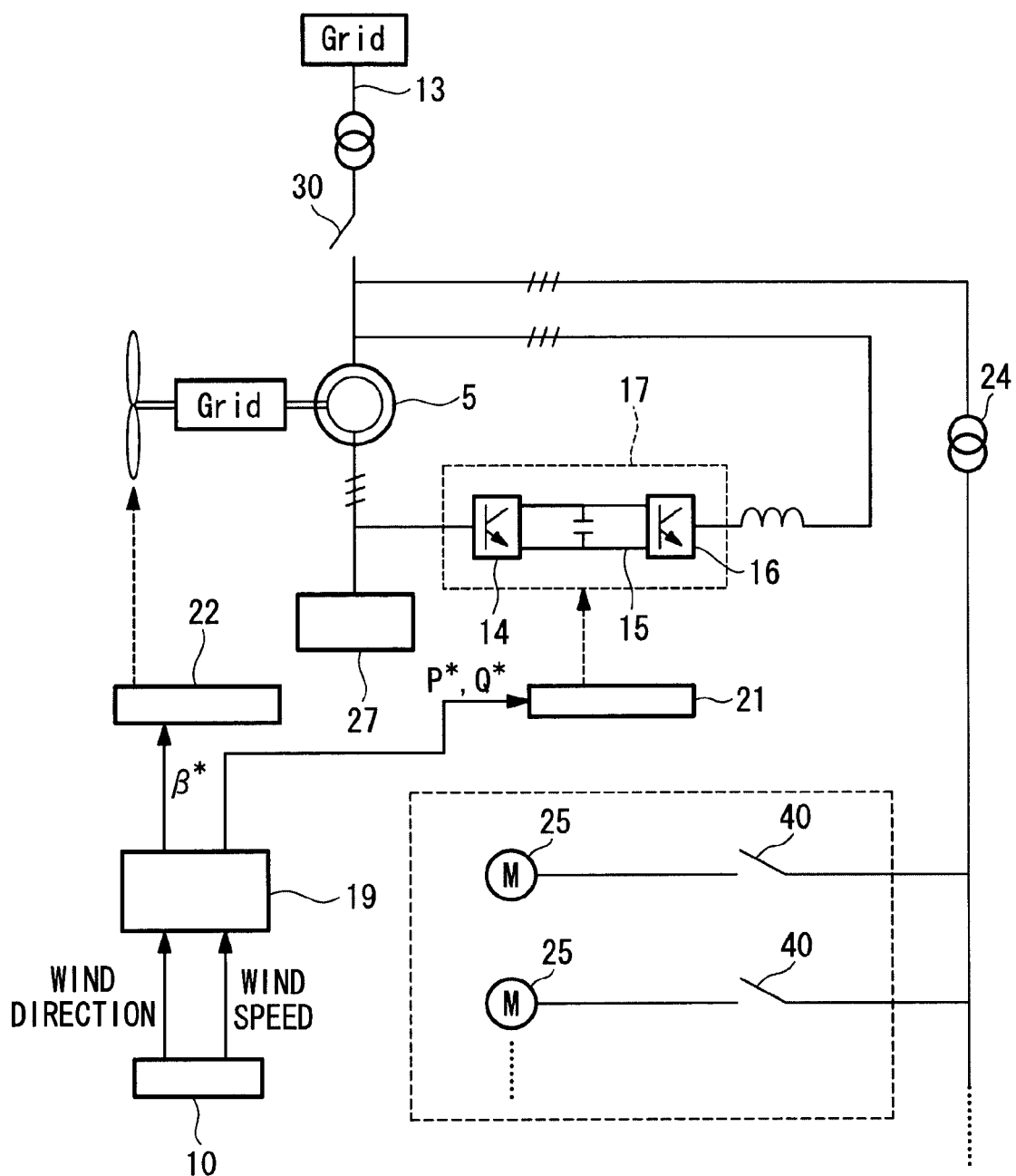
FIG. 2 is a block diagram showing an example configuration of a generator and its surroundings.

FIG. 2 is a block diagram showing an example configuration of the generator 5 and its surroundings. The generator 5 of this embodiment is configured so that power generated at the generator 5 can be output to a power grid 13 from both a stator coil and a rotor coil. More specifically, the stator coil of the generator 5 is connected to the power grid 13 and the rotor coil thereof is connected to the power grid 13 via an AC-DC-AC converter 17.

The AC-DC-AC converter 17 is constituted of an active rectifier (converter) 14, a DC bus 15, and an inverter 16 and converts AC power received from the rotor coil to AC power that matches the frequency of the power grid 13. The active rectifier 14 converts AC power generated at the rotor coil to DC power and outputs the DC power to the DC bus 15. The inverter 16 converts DC power received from the DC bus 15 to AC power having the same frequency as the power grid 13 and outputs the AC power.

The AC-DC-AC converter 17 also has a function of converting AC power received from the power grid 13 to AC power that matches the frequency of the rotor coil and is also used to excite the rotor coil depending on the operating conditions of the wind turbine generator 1. In this case, the inverter 16 converts AC power to DC power and outputs the DC power to the DC bus 15. The active rectifier 14 converts DC power received from the DC bus 15 to AC power that matches the frequency of the rotor coil and supplies the AC power to the rotor coil of the generator 5.

In addition, the rotor coil is connected to a crowbar circuit 27 for protecting the active rectifier 14 against overcurrent. The crowbar circuit 27 is activated when current flowing in the rotor coil or voltage at the DC bus 15 exceeds a predetermined threshold to short circuit the rotor coil via a resistor. In addition, the short circuit may be directly caused without using the resistor. By doing so, the current at the rotor coil is damped so that an overcurrent does not flow into the active rectifier 14.

In addition, a power line that connects the generator 5 to the power grid 13 is provided with a voltage/current sensor (not shown) that measures the output voltage V and output current I of the generator 5. Measured values from the voltage/current sensor are supplied to a converter drive control unit (control unit) 21.

The converter drive control unit 21 controls turning on and off of a power transistor of the active rectifier 14 in order to control active power P and reactive power Q which are output in response to an active power command P* and a reactive power command Q*. More specifically, the converter drive control unit 21 calculates the active power P and the reactive power Q from the output voltage V and the output current I measured by the voltage/current sensor. Furthermore, the converter drive control unit 21 performs PWM control in response to a difference between the active power P and the active power command P* and a difference between the reactive power Q and the reactive power command Q*, thereby generating a PWM signal, and supplies the active rectifier 14 with the generated PWM signal. By doing so, the active power P and the reactive power Q are controlled.

The converter drive control unit 21 monitors generator rotor current and DC link voltage and, when these values exceeds thresholds set in advance, activates the crowbar circuit 27 and also switches off the active rectifier 14 and the inverter 16. This control is what has generally been performed. In this way, instead of activating the crowbar circuit 27, etc. in response to the behavior of the grid voltage, control specifics are switched on the basis of the behaviors of the generator rotor current and the DC link voltage described above; therefore, it is not necessary to add a new function or to set a new judgment standard for low-voltage events.

A blade control unit 22 controls pitch angles β of the blades 8 in response to a pitch command β* sent from a main control unit 19. The pitch angles β of the blades 8 are controlled so as to match the pitch command β*.

During a period in which drive power that enables its operation is being supplied, the blade control unit 22 performs control so as to make the pitch angles β of the blades 8 match the pitch command β*. Therefore, even when the low-voltage event described below is occurring, it is possible to continuously perform the pitch angle control. This eliminates the need to switch the control specifics between when the low-voltage event has occurred and when the low-voltage event has not occurred, thereby making it possible to simplify the control. In addition, by continuously performing normal pitch angle control even during a period in which the low-voltage event is occurring, it is possible to avoid the occurrence of overspeed.

In addition, a transformer 24 is connected downstream of the voltage/current sensor in the power line. The transformer 24 decreases the voltage of AC power received from the power grid 13 via the power line and supplies it to a plurality of auxiliary units 25 provided in the wind turbine generator 1. Examples of the auxiliary units 25 include pump motors, fan motors, and so forth, used for controlling the pitch angles β of the blades 8. In addition, the AC power generated at the transformer 24 may be further converted to DC power using an AC/DC converter (not shown) to be supplied to the main control unit 19, the converter drive control unit 21, and the blade control unit 22 as drive power.

In this embodiment, power lines that connect the individual auxiliary units 25 to the power grid 13 are individually provided with auxiliary-unit breakers 40. Note that, instead of this configuration, for example, a single auxiliary-unit breaker 40 may be provided for a plurality of the auxiliary units 25 or a single auxiliary-unit breaker 40 may be provided for all of the auxiliary units 25.

In addition, the power line that connects the generator 5 to the power grid 13 is provided with a main breaker 30. More specifically, of all the constituent elements provided in the wind turbine, the main breaker 30 is provided at a position closest to the power grid 13.

The above-described main breaker 30 and the auxiliary-unit breakers 40 are disposed, for example, in an interconnection panel (not shown) disposed below the tower 2.

Next, current-resisting capacities of the main breaker 30 and the auxiliary-unit breakers 40 described above, which are the features of the present invention, will be described with reference to the drawings.

The auxiliary-unit breakers 40 have current-resisting capacities within a range that can tolerate the current that flows in a low-voltage event and that does not exceed the tolerable current of motors provided in the auxiliary units 25.

The main breaker 30 has superior current-resisting capacity than the auxiliary-unit breakers 40 and has a current-resisting capacity within a range that does not exceed the tolerable current of the generator 5.

A low-voltage event is, for example, an event in which the voltage becomes 0 V over a period of 100 ms to less than several hundred milliseconds and recovery from the voltage drop takes several seconds. One example of this low-voltage event is a voltage drop pattern required in LVRT.

Figure 3:
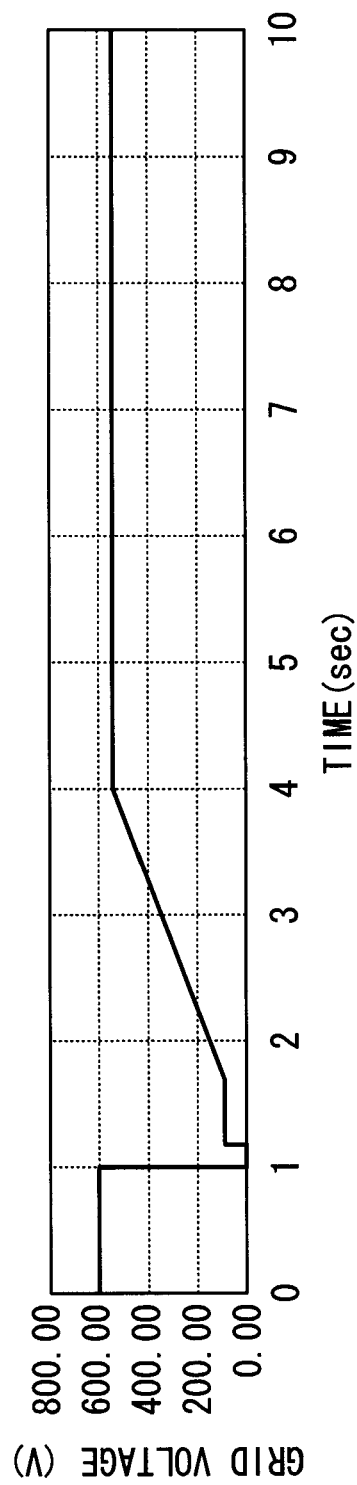
FIG. 3 is a diagram showing an example of a voltage drop pattern required in LVRT.

FIG. 3 shows an example of a voltage drop pattern required in LVRT. In the voltage drop pattern shown in FIG. 3, first, the grid voltage $V_{grid}$ momentarily drops to 0 V; this state continues for 150 ms; and then the voltage gradually recovers, whereby the grid voltage $V_{grid}$ recovers in about four seconds from the time of the momentary voltage drop. The way in which the output voltage V and the output current I of the generator 5 change when the grid voltage $V_{grid}$ changes in this way was analyzed by simulation.

Figure 4:
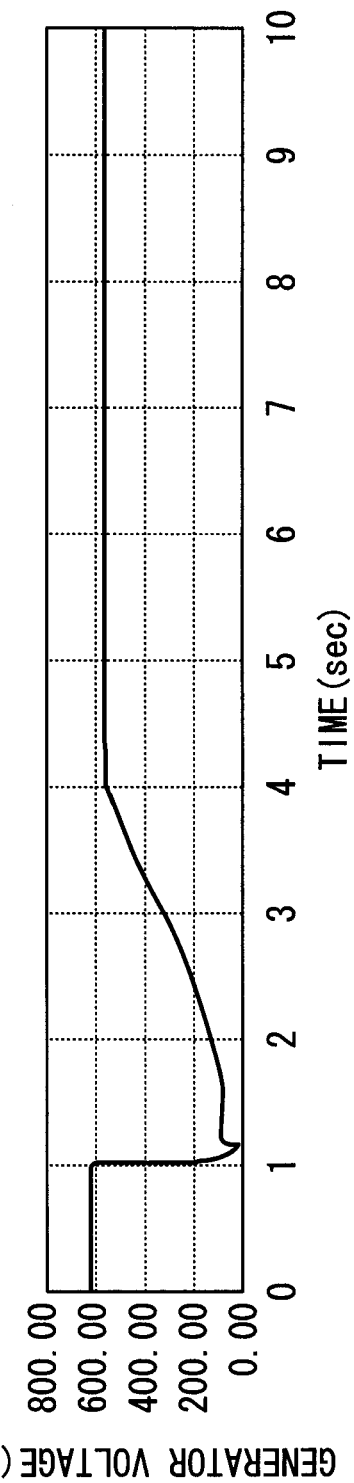
FIG. 4 is a diagram showing analysis results of analyzing the generator output voltage using simulation for the case in which the voltage drop pattern shown in FIG. 3 has occurred.
Figure 5:
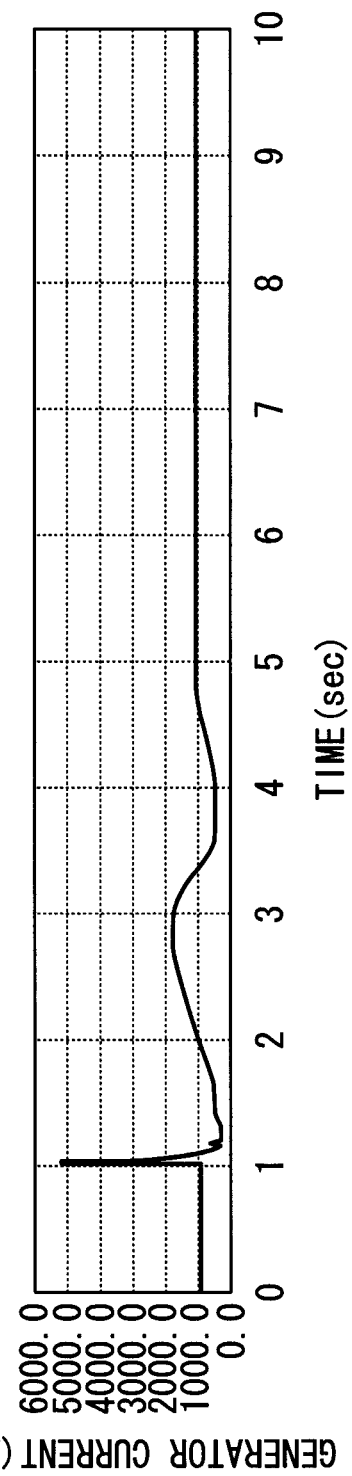
FIG. 5 is a diagram showing analysis results of analyzing the generator output current using simulation for the case in which the voltage drop pattern shown in FIG. 3 has occurred.

Its results are shown in FIGS. 4 and 5. FIG. 4 shows changes in the output voltage V of the generator 5, whereas FIG. 5 shows changes in the output current I of the generator 5. The output voltage V of the generator 5 shown in FIG. 4 exhibits changes substantially similar to the grid voltage $V_{grid}$ shown in FIG. 3. The output current I of the generator 5 shown in FIG. 5 shows an instantaneous flow of overcurrent with an instantaneous drop in the grid voltage $V_{grid}$, then fluctuates above and below the rated current, and stabilizes about several hundred milliseconds after the grid voltage $V_{grid}$ has recovered.

Figure 6:
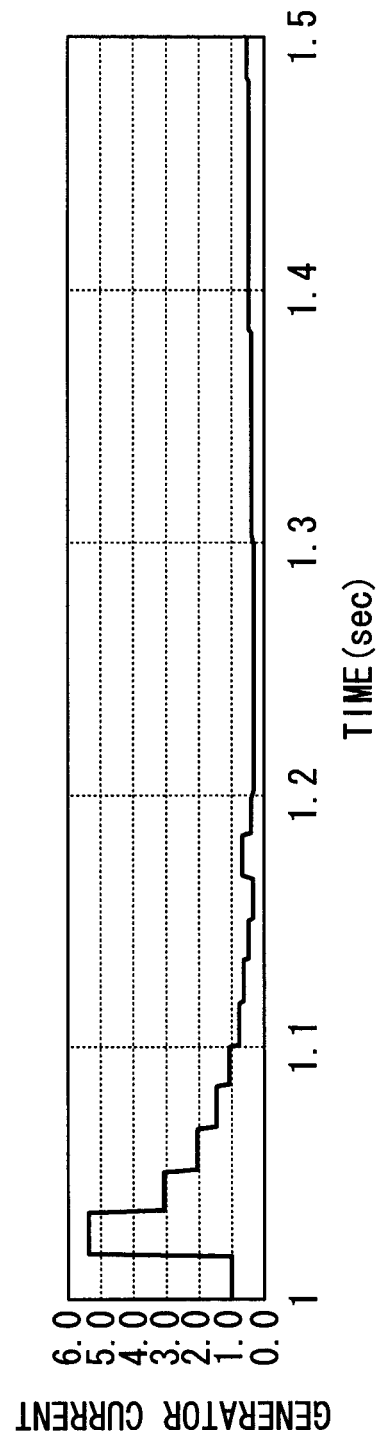
FIG. 6 is a diagram showing the generator output current shown in FIG. 3 expressed as a ratio relative to the rated current, and, in addition, the time axis is displayed in an enlarged view.

FIG. 6 shows the output current I of the generator 5 shown in FIG. 5 as a ratio relative to the rated current, and, in addition, shows the time axis (horizontal axis) in an enlarged view. Because effective values of the output current I of the generator 5 are calculated every 1/60 s, FIG. 6 shows the current levels in a stepped shape. As shown in FIG. 6, when a low-voltage event having the voltage drop pattern shown in FIG. 3 occurs, a current of at most about 5.5 times greater flows for 1/60 s.

Therefore, in order to cope with the voltage drop pattern shown in FIG. 3, the auxiliary-unit breakers 40 need to have current-resisting capacities that are sufficient to avoid disconnection even when an overcurrent of at least 5.5 times the rated current flows.

Note that, the voltage drop pattern of the low-voltage event shown in FIG. 3 is only an example, and the auxiliary-unit breakers 40 need to have current-resisting capacities that overcome, for example, all voltage drop patterns required for LVRT.

Figure 7:
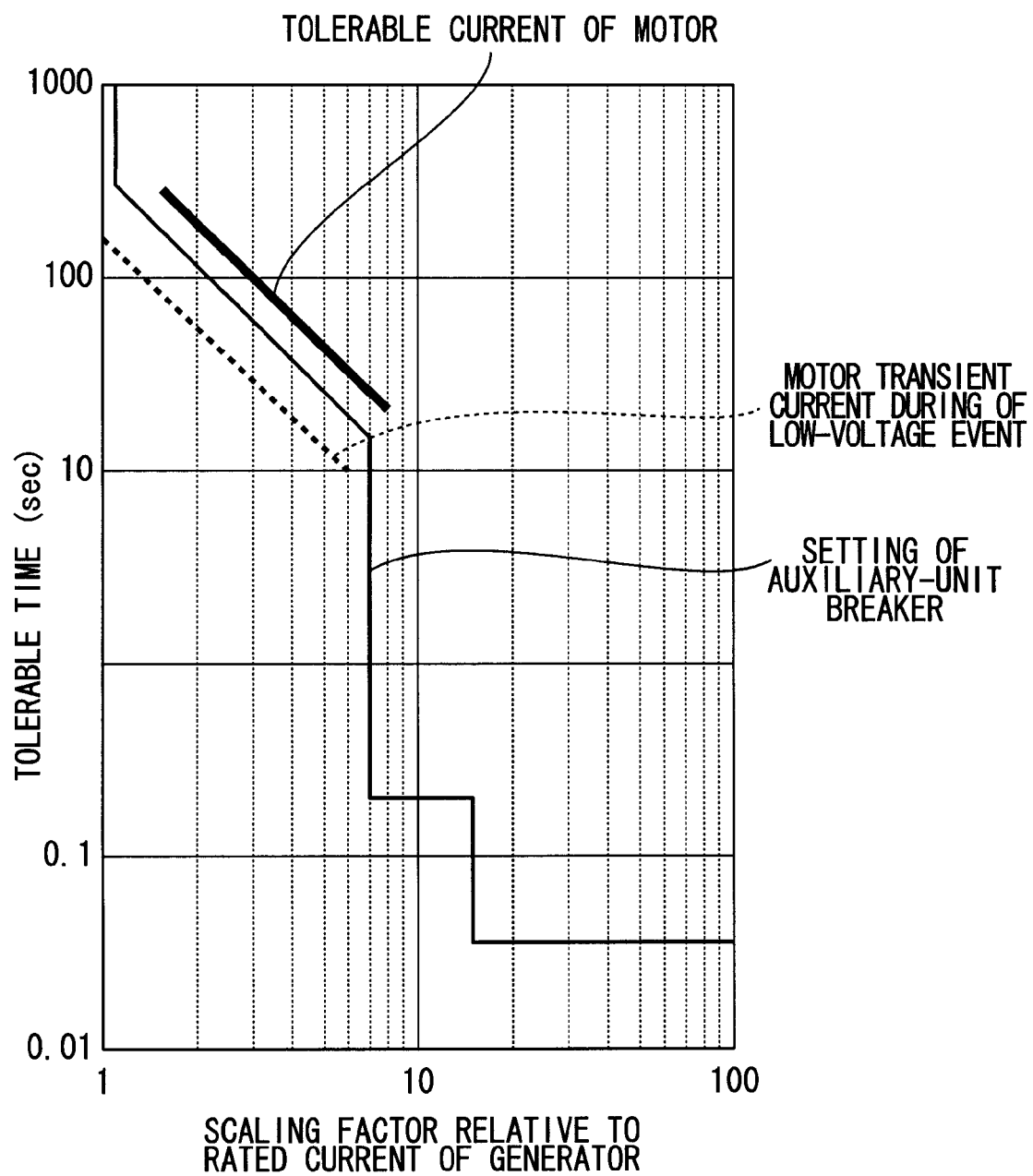
FIG. 7 is a diagram showing an example relationship of tolerable currents of a generator motor and an auxiliary-unit breaker according to an embodiment of the present invention.

Next, FIG. 7 shows an example of the relationship between the tolerable current of the auxiliary-unit breakers and that of the motors of the auxiliary units. In FIG. 7, the horizontal axis indicates a scaling factor of the motor current of the auxiliary units relative to the rated current, and the vertical axis indicates tolerable time (s).

As shown in FIG. 7, the maximum tolerable current of the auxiliary-unit breakers 40 is set lower than the tolerable current of the motors and is set higher than the transient motor current at the time of low-voltage occurrence.

In addition, although not shown, the current-resistance properties of the main breaker is set smaller than the tolerable current of the generator and higher than the auxiliary-unit breakers 40.

The transient motor current at the time of low-voltage occurrence in FIG. 7 may be shown by, for example, the results of the above-described transient analysis or may be determined by calculating the current at the time of a three-phase short circuit in the generator motor instead of performing the above-mentioned transient analysis.

As has been described above, with the wind turbine generator 1 according to this embodiment, the auxiliary-unit breakers 40 and the main breaker 30 have current-resisting capacities that make it possible to endure the occurrence of overcurrent caused by voltage drops due to low-voltage events; therefore, even if a low-voltage event occurs, it is possible to maintain, without causing disconnection, connections between the power grid 13 and the individual auxiliary units 25, as well as the connection between the power grid 13 and the generator 5. Accordingly, it is possible to normally operate the auxiliary units 25 even during a period in which a low-voltage event is occurring. That is, an advantage is afforded in that there is no need to turn on/off auxiliary units during a period in which a low-voltage event is occurring.

Furthermore, the converter drive control unit 21 and the blade control unit 22 also continuously perform normal control during a period in which a low-voltage event is occurring; therefore, the pitch angles of the blades 8 and the AC-DC-AC converter 17 can be controlled with a configuration similar to the conventional one without having to provide a new control logic for the low-voltage events.

The invention claimed is:

1. A wind turbine generator comprising:
    a generator;
    a main breaker provided in a power line that connects the generator to a power grid; and
    an auxiliary-unit breaker provided in a power line that connects an auxiliary unit to the power grid, the auxiliary-unit breaker being configured to break the connection of the auxiliary unit to the power grid in respond to an overcurrent that flows in the auxiliary-unit breaker,
    wherein the auxiliary-unit breaker has a current-resisting capacity within a range that tolerates a current that flows in a low-voltage event and that does not exceed a tolerable current of a motor provided in the auxiliary unit, and
    the main breaker has a current-resisting capacity that is superior to the current-resisting capacity of the auxiliary-unit breaker and that is within a range that does not exceed a tolerable current of the generator.

2. A wind turbine generator according to claim 1, further comprising:
    a plurality of blades; and
    a blade control unit that controls pitch angles of the plurality of blades,
    wherein the blade control unit performs control of the pitch angles of the blades during a period in which drive power that enables its operation thereof is being supplied.

3. A wind turbine generator according to claim 1, further comprising:
    a converter that converts output of the generator rotor from three-phase AC power to DC power;
    an inverter that converts DC power output from the converter to three-phase AC power; and
    a control unit that controls the converter and the inverter,
    wherein the control unit monitors a rotor current of the generator or the DC voltage converted by the converter and, when the rotor current or the DC voltage exceeds a current threshold or a voltage threshold set in advance, stops the operation of the converter and the inverter.

4. A wind turbine generator according to claim 1, wherein the auxiliary-unit breaker is connected to the power line at a side of the generator with respect to the main breaker.

5. A wind turbine generator according to claim 1, wherein the auxiliary unit comprises the motor, and
    the motor tolerates a current which is smaller than the overcurrent, but higher than the current that flows in the low-voltage event.

* * * * *